R. B. BENJAMIN.
WATER TIGHT CONNECTION FOR ELECTRICAL CONDUCTORS.
APPLICATION FILED OCT. 18, 1918.
1,345,473. Patented July 6, 1920.
Fig. 1.
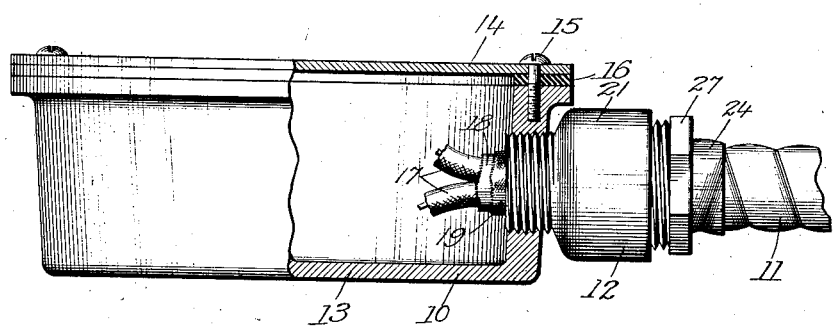
Fig. 2.
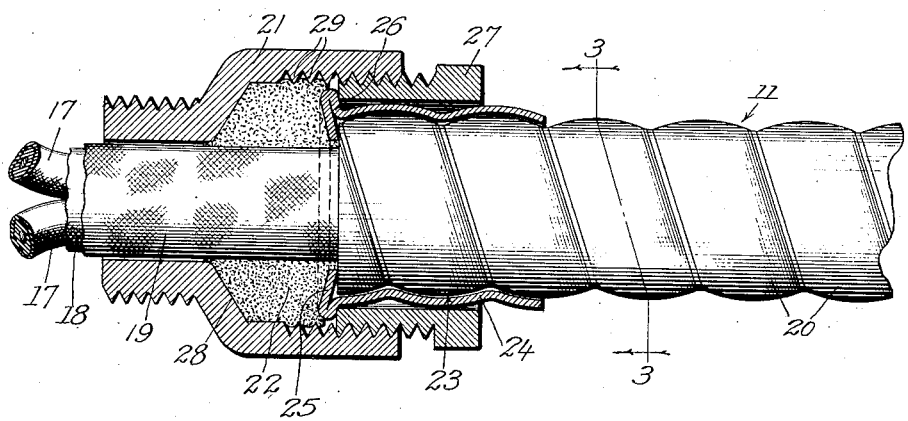
Fig. 3.
Witnesses:
Roberts F. Weir
Arthur W. Carbon
Inventor
Reuben B. Benjamin
Jones, Addington, Ames

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

WATER-TIGHT CONNECTION FOR ELECTRICAL CONDUCTORS.

1,345,473.  Specification of Letters Patent.  Patented July 6, 1920.

Application filed October 18, 1918. Serial No. 258,747.

*To all whom it may concern:*

Be it known that I, REUBEN B. BENJAMIN, a citizen of the United States, residing at Chicago, in the county of Cook and State of Illinois, have invented new and useful Improvements in Water-Tight Connections for Electrical Conductors, of which the following is a full, clear, concise, and exact description, reference being had to the accompanying drawing, forming a part of this specification.

This invention relates to a watertight connection for electrical conductors.

One of the objects of my invention is to provide an improved watertight connection between an electrical conductor and a junction-box or outlet-box or the like, into which the conductor is led. Further objects will appear from the detailed description to follow and from the appended claims.

In the drawings, in which an embodiment of my invention is shown—

Figure 1 is a view, partly in section, showing a junction- or outlet-box and a conductor-carrying cable connected therewith;

Fig. 2 is an axial section of the connection between the junction-box and the cable; and Fig. 3 is a transverse section on the line 3—3 of Fig. 2.

In order to give a general idea of the invention, it is here stated that junction-boxes and outlet-boxes on shipboard are sometimes located so that they are exposed to the weather, and it is therefore necessary to make watertight the connection between the box and the cable entering the box, in order to prevent water from getting into the box through the opening provided for the entry of the cable. To accomplish this result, I provide a stuffing box surrounding the cable or conductors and secured to the outlet or junction box.

Referring now to the drawings in detail, my invention is shown in connection with a junction- or outlet-box 10, an armored cable 11, and a watertight fitting 12, which mechanically secures the cable 11 with respect to the box 10 and also forms a watertight connection between the box and the cable.

The junction-box 10 may be of any usual or suitable construction, comprising the box proper 13, which may be a metal casting, the cover 14 secured to the box 13 by means of screws 15, and the gasket 16 between the cover 14 and box 13 for effecting a watertight joint between the cover and the box.

The armored cable 11 comprises the insulated conductors 17, a fibrous cover 18 surrounding the conductors 17, a lead sheath 19 surrounding the fibrous portion 18, and a protective metal armor 20 in the form of strips wound helically about the lead sheath 19.

The watertight connection 12 between the box and the cable comprises a stuffing-box 21 secured to the junction-box 10, an annular packing 22 of rubber or other suitable material located in the stuffing-box 21 and surrounding the lead sheathing 19, a connecting member 23 having a helical portion 24 for connection with the helical armor 20, an annular portion 25 for bearing on the packing 22, a shoulder portion 26, and a stuffing-box nut 27 threaded into the stuffing-box 21 and bearing on the shoulder portion 26.

In making the connection the stuffing-box 21 is screwed into the junction-box 10, the armor 20 is removed from the cable for a portion of its length to expose the lead sheathing 19, the stuffing-box nut 27 is slipped on over the end of the cable and back onto the armored portion 20, the connecting member 23 is slipped over the end of the cable and threaded onto the spiral armor 20, that portion of the cable from which the armor has been removed is inserted through the stuffing-box 21, so that the insulated conductors 17 extend within the junction-box, the stuffing-box nut 27 is then slipped down over the connecting member 23 until it engages the shoulder 26, and the stuffing-box nut 27 is then threaded into the stuffing-box 21.

The nut 27 and connecting member 23 not only serve to compress the packing 22 to effect a watertight connection, but also serve to mechanically connect the cable 20 with the junction-box 10.

I claim as new and desire to secure by Letters Patent of the United States:

1. A device for connecting a helically armored cable with a box, comprising a stuffing-box provided with means for securing it to said first box; a packing in said stuffing-box; a connecting member having a helical portion for screwing onto said helical armor, and a portion for bearing on said packing; and a stuffing-box nut for having threaded engagement with said stuffing-box and bearing on said connecting member to hold said connecting member in place and force it against said packing.

2. A device for connecting a helically-armored cable with a box, comprising a stuffing-box provided with means for securing it to said first box; a packing in said stuffing-box; a connecting member having a helical portion for screwing onto said helical armor; and means for securing said connecting member to said stuffing-box.

3. A device for connecting a helically-armored cable with a box, comprising a stuffing-box provided with means for securing it to said first box; an annular packing in said stuffing-box; a connecting member provided with a helical portion for screwing on said helical armor, an annular portion for bearing on said annular packing, and an annular shoulder; and a stuffing-box nut surrounding said connecting member and having threaded engagement with said stuffing-box and having a portion for bearing on said annular shoulder to hold said connecting member in place and force said annular portion against said packing.

4. A device for connecting a cable with a box, which cable has a flexible metal sheath and a helical metallic armor surrounding said sheath, said device comprising a stuffing-box provided with means for securing it to said first box and having an opening through which said flexible metal sheath extends into said first box, and having a packing chamber; an annular packing in said chamber and surrounding said sheath; a connecting member having a helical portion for screwing onto said helical armor and an annular portion the opening in which is of smaller diameter than the opening in said helical portion, through which said flexible metal sheath extends, for bearing on said packing; and means for securing said connecting member to said stuffing-box and for forcing said annular portion against said packing.

5. The combination with a box and a helically-armored cable, of a device for connecting said box and cable comprising a stuffing-box provided with means for securing it to said first box; a packing in said stuffing-box; a connecting member having a helical portion for screwing onto said helical armor and a portion for bearing on said packing; and a stuffing-box nut for threading into said stuffing-box and bearing on said connecting member to hold said connecting member in place and force it against said packing.

6. The combination with a box and a helically-armored cable, of a stuffing-box provided with means for securing it to said first box; a packing in said stuffing-box; a connecting member having a helical portion for screwing onto said helical armor; and means for securing said connecting member to said stuffing-box.

7. The combination with a box and a cable having a flexible metal sheath and a helical metallic armor surrounding said sheath, of a device for connecting said cable with said box comprising a stuffing-box provided with means for securing it to said first box and having an opening through which said flexible metal sheath extends into said first box, and having a packing-chamber; an annular packing in said chamber surrounding said sheath; a connecting member having a helical portion for screwing onto said helical armor, and an annular portion the opening in which is of smaller diameter than the opening in said helical portion, through which said flexible metal sheath extends, for bearing on said packing; and means for securing said connecting member to said stuffing-box and for forcing said annular portion against said packing.

8. The combination with a helically-armored cable, of a device for connecting said helically-armored cable with a box comprising a stuffing-box provided with means for securing it to said first box; a packing in said stuffing-box; a connecting member having a helical portion for screwing onto said helical armor; and means for securing said connecting member to said stuffing-box.

9. The combination with a helically-armored cable, of a device for connecting said cable with a box comprising a stuffing-box provided with means for securing it to said first box; an annular packing in said stuffing-box; a connecting member provided with a helical portion for screwing onto said helical armor, an annular portion for bearing on said annular packing, and an annular shoulder, and a stuffing-box nut surrounding said connecting member, and having threaded engagement with said stuffing-box and having a portion for bearing on said annular shoulder to hold said connecting member in place and force said annular portion against said packing.

10. A device for connecting a helically-armored cable, comprising a stuffing-box, a packing in said stuffing-box, a connecting member having a helical portion for screwing onto said helical armor and means for securing said connecting member to said stuffing-box.

11. A device for connecting a helically-armored cable, comprising a stuffing-box, a packing in said stuffing-box, a connecting member having a helical portion for screwing onto said helical armor and a portion bearing on said packing, and means for securing said connecting member to said stuffing-box.

In witness whereof I have hereunto subscribed my name.

REUBEN B. BENJAMIN.